Oct. 20, 1925.
P. F. DUSHA ET AL
1,558,254
MACHINE FOR CUTTING BUTTON BLANKS
Filed Nov. 12, 1924
2 Sheets-Sheet 2
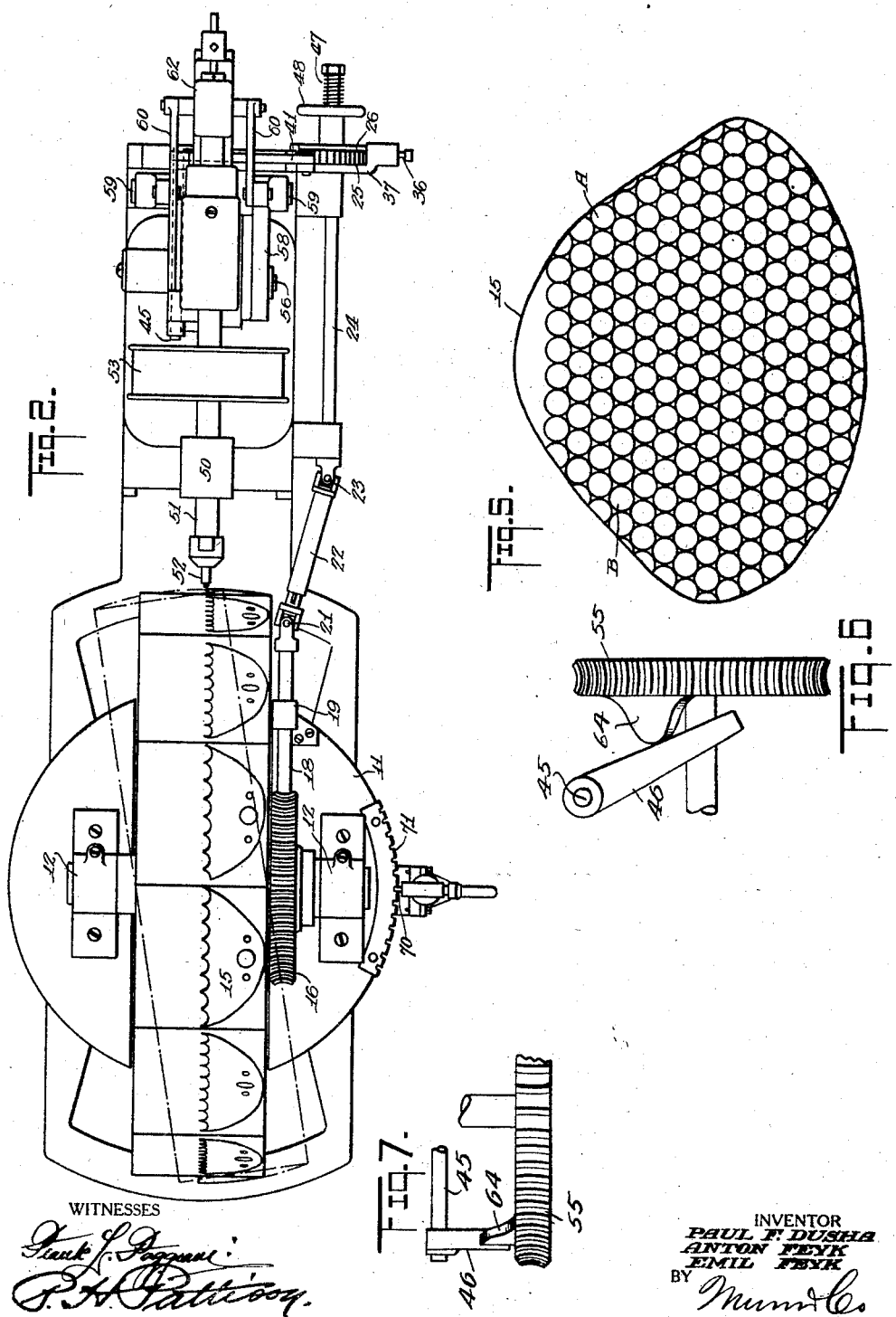
INVENTOR
PAUL F. DUSHA
ANTON FEYK
EMIL FEYK
BY
ATTORNEYS Patented Oct. 20, 1925.

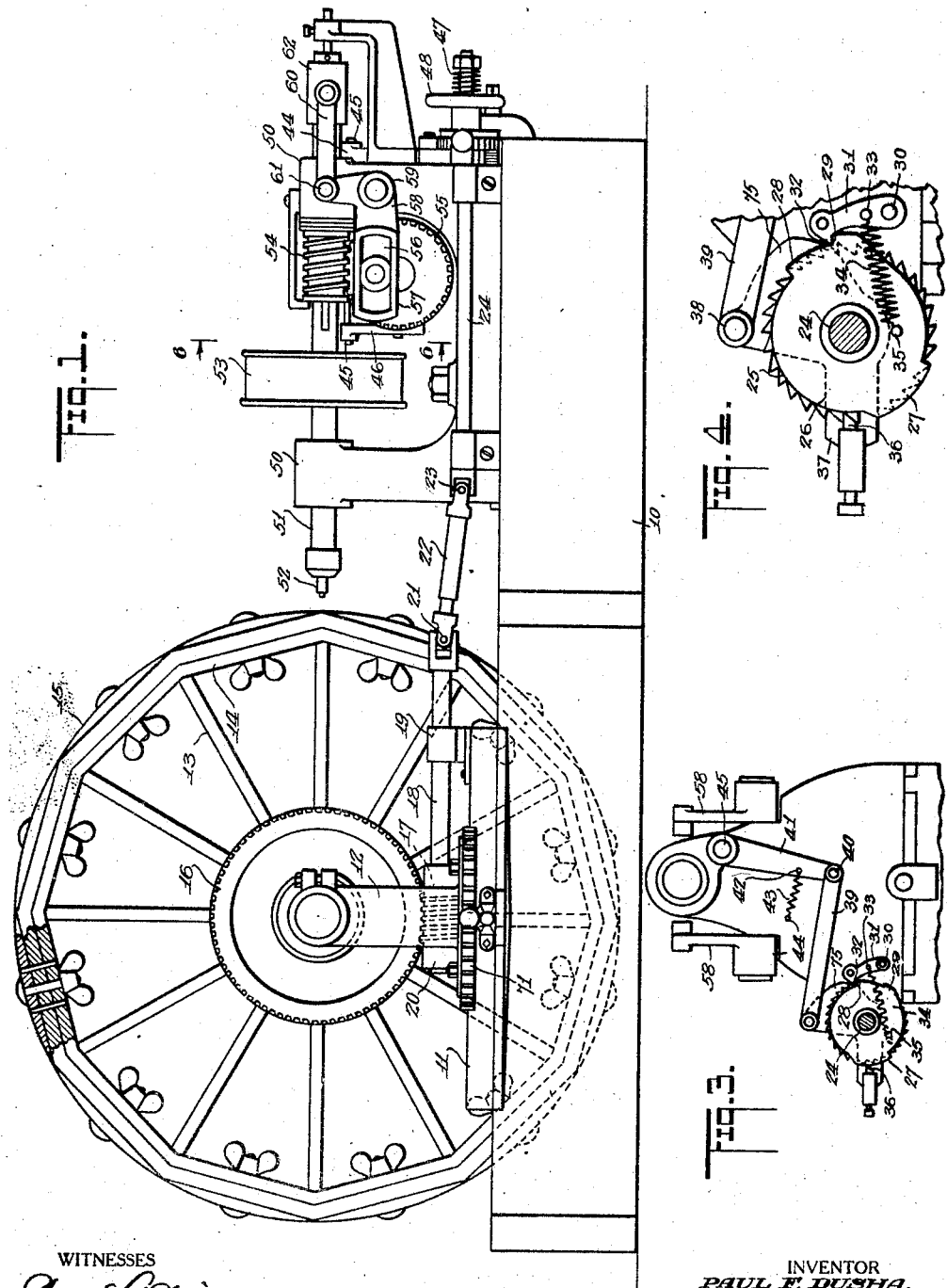

1,558,254

UNITED STATES PATENT OFFICE.

PAUL F. DUSHA, OF NEW YORK, ANTON FEYK, OF BOHEMIA, AND EMIL FEYK, OF NEW YORK, N. Y., ASSIGNORS TO HOLUB-DUSHA CO., OF NEW YORK, N. Y., A CORPORATION OF NEW YORK.

MACHINE FOR CUTTING BUTTON BLANKS.

Application filed November 12, 1924. Serial No. 749,466.

*To all whom it may concern:*

Be it known that we, PAUL F. DUSHA, ANTON FEYK, and EMIL FEYK, all citizens of the United States, and residents, respectively, of the city of New York, borough of Manhattan, in the county and State of New York, Bohemia, in the county of Suffolk and State of New York, and of the city of New York, borough of Manhattan, in the county and State of New York, have invented a new and Improved Machine for Cutting Button Blanks, of which the following is a full, clear, and exact description.

The present invention relates to new and useful improvements in machines for cutting pearl button blanks from shells, and it is one of the primary objects of the invention to provide a machine which will be practically automatic in its operation.

In the manufacture of pearl buttons, elongated cylindrical blanks are cut from shells and the operation generally is carried out by hand.

In order to prevent waste, it is necessary that the button blanks be cut from the shell in close proximity to each other and in staggered relation. This operation has made it necessary to cut the blanks by hand since a machine has not been devised which would properly position the cutting tool automatically in order to produce the desired result.

It is one of the objects of the present invention to provide a machine in which a plurality of shells are presented singly to a cutting tool and moved in a step-by-step relation thereto in order that blanks may be singly cut.

It is a further object of the invention so to construct the machine that it will be possible to use thereon shells of concavo-convex form.

It is a further object of the invention so to construct the machine that after all of the shells have received a series of operations they may be moved about a vertical axis in order that the tool may be presented to a new area of the shell from which a blank may be cut.

It is a still further object of the invention to construct the machine in such a manner that after all of the shells have been operated upon to cut a series of blanks therefrom, the relation of the shell to the tool is changed in order that the next series of operations may be stepped with respect to the previous set of operations so as to prevent waste of material.

With the above and other objects in view, reference is had to the accompanying drawings, in which Figure 1 is a view in side elevation of a machine constructed in accordance with the present invention;

Fig. 2 is a top plan view thereof;

Fig. 3 is a view in end elevation of the machine;

Fig. 4 is a detail enlarged view of a portion of the mechanism of the machine;

Fig. 5 is a detail plan view of one of the shells from which the pearl button blanks are cut and showing the manner in which the machine operates;

Fig. 6 is a detail sectional view on the line 6—6 of Fig. 1.

Figure 7 is a fragmentary plan view of Figure 6.

Referring more particularly to the drawings, the reference numeral 10 designates a suitable base, and mounted on said base there is a turntable 11. Projecting vertically from the turntable 11 are two bearings 12, in which is mounted a bull wheel 13. This bull wheel 13 has a plurality of flat faces 14, and each of such flat faces is adapted to carry a shell 15, from which pearl button blanks are to be cut. This bull wheel 13 carries a worm wheel 16, and meshing with said worm wheel 16 there is a worm gear 17 driven by a shaft 18 mounted in suitable bearings 19 and 20. The reference numeral 21 designates a universal joint, and connected thereto at one of its ends there is a short shaft 22, the opposite end of which is connected to a universal joint 23 carried by a shaft 24.

Mounted on the rear of the shaft 24, there is a ratchet wheel 25, and such ratchet wheel is connected to the shaft 24 and forms the means by which the shaft is driven. Loosely mounted on the shaft 24 in close proximity to the ratchet wheel 25, there is a cam plate 26 having three cam members 27, 28 and 29. Mounted on the frame of the machine as at 30, and engaging the cam plate 26, there is a locking pawl 31 having a cam plate engaging nose 32. Connected, as at 33, to this locking pawl 31, there is a spring 34, the opposite end of which is connected, as at 35, to the cam plate for a purpose to be hereinafter described.

The ratchet wheel 25 is operated by means of a spring-pressed dog 36, and such spring-pressed dog 36 is carried by a bell crank lever 37 mounted on the shaft 24. Connected, as at 38, to the bell crank lever 37, there is a lever 39, which lever 39 is pivotally connected as at 40, to a lever 41. Connected to this lever 41, as at 42, there is a spring 43, the opposite end of which is connected to the frame of the machine, as at 44.

The lever 41 is connected to a shaft 45 suitably mounted in the frame and such shaft extends forwardly of the machine, as shown in Fig. 1, and on its forward end carries a depending lever 46, which is secured to the shaft and serves as the means by which such shaft is operated.

The cam plate 26 heretofore mentioned is maintained in engagement with the ratchet wheel 25, by means of a spring 47, and the said cam plate is provided with a thumb wheel 48 by means of which it may be rotated for a purpose to be hereinafter described.

Carried by the base 10, there is a plurality of bearings 50, and mounted in such bearings there is a shaft 51, the forward end of which carries a cutting tool 52 positioned adjacent the bull wheel 13. Mounted on this shaft there is a pulley 53, around which a suitable belt passes to drive the shaft 51. Carried by the shaft 51 there is a worm gear 54 meshing with a worm wheel 55 and driving the latter when the shaft 51 is rotated. This worm wheel 55 carries a crank pin 56, and such crank pin moves in a yoke 57 in the bell crank lever 58, which bell crank lever 58 is pivotally mounted as at 59. To the opposite end of the bell crank lever, a link 60 is pivotally connected as at 61, and such link operates a collar 62 which is carried by the shaft 51 and serves to reciprocate said shaft in order to move the cutting tool 52 toward and away from the bull wheel 13. This worm wheel 55 carries a cam 64 which engages the lever 46 heretofore mentioned so that upon each revolution of the worm wheel 55, the lever 46 will be moved to rock the shaft 45.

The device operates in the following manner:

With the several parts in the position shown in Fig. 1, if the machine be started, the tool 52 will, by reason of the worm gear 54 and worm wheel 55 and bell crank lever 58, be fed toward the bull wheel and the cutting tool will remove a blank in the shell with which it is engaged, leaving an opening designated by the reference character A in Fig. 5. After the blank has been cut, continued movement of the bell crank lever 58 withdraws the tool 52. At this time in the operation of the machine, the cam or projection 64 of the worm wheel 55 is in engagement with the lever 46 and upon continued operation of the worm wheel 55, the shaft 45 will be rocked, and through the medium of the levers 41, 39 and 37, the pawl 36 will move the ratchet wheel 25, for example, a distance of four teeth. This movement of the ratchet wheel 25 moves the shaft 24, and through the medium of the universal joints 21 and 23 and the short shaft 22, the shaft 18 is rotated. Upon rotation of the shaft 18, the bull wheel 13 will be moved one step so that an uncut portion of the shell will be presented to the tool upon its next advancement toward the shell so that another blank may be cut.

The aforedescribed operation is carried out until a complete revolution of the bull wheel has been made. After a complete revolution of the bull wheel has been described, it is obvious that if the machine were allowed to continue operating, the tool would engage those portions previously cut out and no blanks would be formed. To obviate this, the pawl 70 is disengaged from the rack 71 and the turntable 11 is rotated about a vertical axis, one notch, which presents a new area of the shells to the cutting tool 52, so that as a further revolution of the bull wheel is had, button blanks will be cut from the shells. This movement of the turntable takes care of the concavo-convex formation of the shells, causing their outer surfaces to move in an arc so that the cutting tool 52 always engages the outer surfaces of the shells substantially at right angles thereto, in order that a more perfect button blank may be cut.

Assuming that upon the complete revolution of the bull wheel 13 the openings left by the series of blanks cut be designated by the reference character A in Fig. 5, as aforesaid, if this operation were continued, it is apparent that the button blanks would be cut directly alongside each other and there would be considerable waste. In order to prevent this, the bull wheel is moved two teeth instead of four, before the second series of operations, designated by the reference character B in Fig. 5, is carried out. This is accomplished in the following manner:

Referring to Fig. 4 in which the several parts are shown in their normal positions, which positions permit of the pawl or dog 36 moving four teeth upon each operation, the thumb wheel 48 is grasped and turned to the right, which turns the cam plate 26 to the right in Fig. 4, until the locking nose 32 of the pawl 31 engages the shoulder of the cam member 28, in which position it is shown in Fig. 3. With the parts in this position, as the bell crank lever 37 is moved to the left in Figs. 3 and 4, the spring-pressed dog or pawl 36 rides the cam member 27 and thus skips two of the teeth thereof. Upon the return movement of the bell crank lever 37, the spring-pressed dog or pawl 36 again engages the teeth of the ratchet member and moves the shaft 24 a distance of two teeth only, which changes the relative position of the bull wheel 13 with respect to the cutting tool 52 in order that the series of operations designated B in Fig. 5, may be made in the position relative to those designated by the reference character A in Fig. 5, rather than alongside them, and thus reducing to a minimum the waste incident to cutting button blanks in this manner.

Simultaneously with this operation, upon movement of the bell crank lever 37 to the left, the cam 75 of the bell crank lever 37 will disengage the locking pawl 31 from the shoulder of the cam 28, and under the influence of the spring 34, the cam plate 26 will be returned to its normal position in which it is shown in Fig. 4, and thus permit the spring-pressed dog or pawl 36 to move the ratchet wheel four teeth at a time until another complete revolution of the bull wheel 13 is had, when the aforementioned operation is again repeated in order that the next series of blanks may be cut with their centers offset with respect to the preceding series.

It will thus be noted that in the operation of the machine, means are provided for shifting the axis of the bull wheel about an axis intersecting at a right angle the said axis of the bull wheel and also the axial line of the cutter.

From the foregoing it is apparent that the present invention provides a machine for cutting button blanks, which is substantially automatic in its operation, there being but two manuel operations necessary, that is, the setting of the bull wheel about its vertical axis, and the stepping of the series of blanks cut.

What is claimed is:

1. A machine for cutting button blanks, comprising a rotary bull wheel adapted to receive on its periphery a circular series of shells, a cutter having a fixed mounting and movable toward and away from the bull wheel to cut blanks from the shells, means for imparting a step by step feed to the bull wheel whereby the cutter is adapted to remove a line of blanks from the successive shells on the bull wheel, and means for shifting the axis of the bull wheel about an axis intersecting at a right angle the said axis of the bull wheel and also the axial line of the cutter.

2. A machine for cutting button blanks, comprising a rotary bull wheel adapted to receive on its periphery a circular series of shells, a cutter having a fixed mounting and movable toward and away from the bull wheel to cut blanks from the shells, means for imparting a step by step feed to the bull wheel whereby the cutter is adapted to remove a line of blanks from the successive shells on the bull wheel, means for imparting a reciprocating and rotary motion to the cutter, means controlling the movement of the bull wheel in synchronism with the movement of the cutter, and means for shifting the axis of the bull wheel about an axis intersecting at a right angle the said axis of the bull wheel and also the axial line of the cutter.

PAUL F. DUSHA.
ANTON FEYK.
EMIL FEYK.